US012293716B2

(12) United States Patent
Zhang

(10) Patent No.: US 12,293,716 B2
(45) Date of Patent: May 6, 2025

(54) DISPLAY PANEL, INTEGRATED CHIP, AND DISPLAY DEVICE

(71) Applicant: Xiamen Tianma Display Technology Co., Ltd., Xiamen (CN)

(72) Inventor: Yuheng Zhang, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/380,311

(22) Filed: Oct. 16, 2023

(65) Prior Publication Data

US 2024/0038171 A1 Feb. 1, 2024

(30) Foreign Application Priority Data

Jun. 28, 2023 (CN) ......................... 202310772910.0

(51) Int. Cl.
*G09G 3/3233* (2016.01)
*G09G 3/32* (2016.01)
*G09G 3/3275* (2016.01)

(52) U.S. Cl.
CPC ............. *G09G 3/3233* (2013.01); *G09G 3/32* (2013.01); *G09G 3/3275* (2013.01); *G09G 2310/0275* (2013.01); *G09G 2320/0233* (2013.01); *G09G 2330/021* (2013.01)

(58) Field of Classification Search
CPC .. G09G 3/3275; G09G 3/3291; G09G 3/3258; G09G 2320/0626; G09G 2320/0238; G09G 2320/0233; G09G 2310/0275; G09G 2310/027; G09G 2300/0819; G09G 2330/021; G09G 3/32; G09G 3/3208; G09G 2300/0452; G09G 2320/02; G09G 2320/0673
See application file for complete search history.

(56) References Cited

U.S. PATENT DOCUMENTS

2019/0340981 A1* 11/2019 Pyo ...................... G09G 3/3291
2020/0143733 A1* 5/2020 Kim ...................... G09G 3/2018
2020/0202790 A1* 6/2020 Rha ...................... G09G 3/2007
2022/0199036 A1* 6/2022 Wang ...................... G09G 3/3266
2022/0335872 A1* 10/2022 Zhang ...................... G09G 3/20

FOREIGN PATENT DOCUMENTS

CN 110473499 A * 11/2019 ........... G09G 3/3208
CN 114420032 A * 4/2022 ............... G09G 3/20

* cited by examiner

*Primary Examiner* — Xuemei Zheng
(74) *Attorney, Agent, or Firm* — KDW Firm PLLC

(57) ABSTRACT

Provided are a display panel, an integrated chip, and a display device. The display panel includes a pixel circuit and a light-emitting element. The pixel circuit includes a driving module and a data writing module. The driving module is configured to supply a driving current to the light-emitting element. The data writing module is configured to write a data signal into the driving module. An operating mode of the display panel includes a first mode and a second mode. The brightness of the display panel in the first mode is greater than the brightness of the display panel in the second mode. In the first mode, the data signal corresponding to the light-emitting element is black state voltage $G0_1$, and in the second mode, the data signal corresponding to the light-emitting element is black state voltage $G0_2$, where $G0_1 \neq G0_2$.

20 Claims, 13 Drawing Sheets

DISPLAY PANEL, INTEGRATED CHIP, AND DISPLAY DEVICE

CROSS-REFERENCE TO RELATED APPLICATION(S)

This application claims priority to Chinese Patent Application No. 202310772910.0 filed Jun. 28, 2023, the disclosure of which is incorporated herein by reference in its entirety.

TECHNICAL FIELD

The present application relates to the field of display technologies, in particular, a display panel, an integrated chip, and a display device.

BACKGROUND

With the continuous update of display panel technology, the display panel is gradually developing towards a thin and light feature, high screen-to-body ratio, and low power consumption.

In related art, the display panel has a problem of high power consumption when displaying.

SUMMARY

Embodiments of the present application provide a display panel, an integrated chip, and a display device, which helps reduce the power consumption of the display panel.

In a first aspect, embodiments of the present application provide a display panel. The display panel includes a pixel circuit and a light-emitting element. The pixel circuit includes a driving module and a data writing module. The driving module is configured to supply a driving current to the light-emitting element. The data writing module is configured to write a data signal into the driving module. An operating mode of the display panel includes a first mode and a second mode. The brightness of the display panel in the first mode is greater than the brightness of the display panel in the second mode. In the first mode, the data signal corresponding to the light-emitting element is black state voltage $G0_1$, and in the second mode, the data signal corresponding to the light-emitting element is black state voltage $G0_2$, where $G0_1 \neq G0_2$.

Based on the same inventive concept, in a second aspect, embodiments of the present application also provide an integrated chip configured to supply a signal to the display panel provided in the embodiments of the first aspect. An operating mode of the display panel includes a first mode and a second mode. The brightness of the display panel in the first mode is greater than the brightness of the display panel in the second mode. In the first mode, the data signal supplied by the integrated chip is black state voltage $G0_1$, and in the second mode, the data signal supplied by the integrated chip is black state voltage $G0_2$, where $G0_1 \neq G0_2$.

Based on the same inventive concept, in a third aspect, embodiments of the present application also provide a display device. The display device includes the display panel described in the preceding first aspect.

BRIEF DESCRIPTION OF DRAWINGS

Other features, objects, and advantages of the present application are more apparent after a detailed description of non-limiting embodiments with reference to the drawings below is read. The same or similar reference numerals denote the same or similar features. The drawings are not drawn to actual scale.

DETAILED DESCRIPTION

Figure 1:
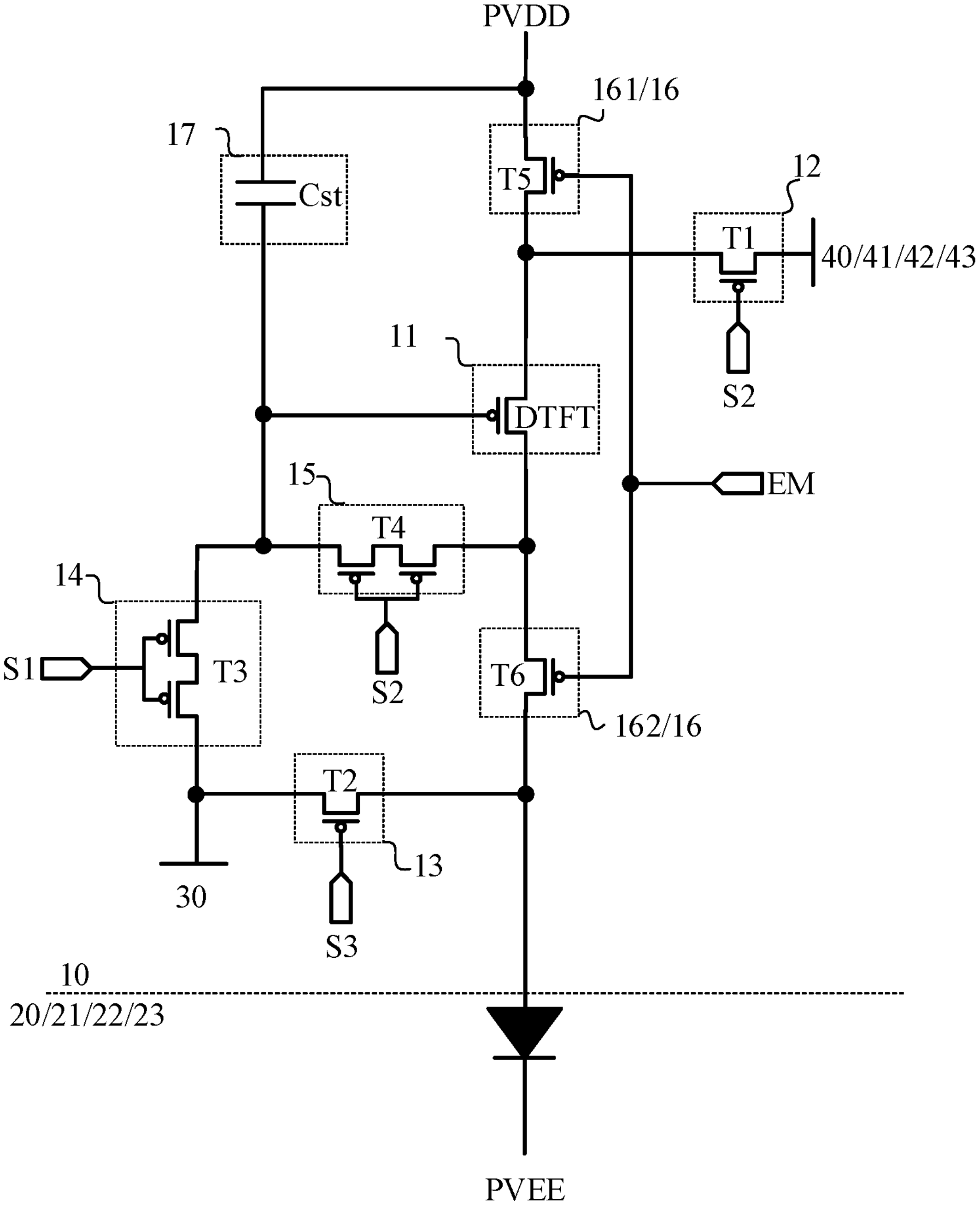
FIG. 1 is a diagram illustrating the structure of a pixel circuit in a display panel according to embodiments of the present application.

Features and exemplary embodiments of various aspects of the present application are described in detail below. The present application is described in detail in conjunction with the embodiments and the accompanying drawings, from which the purpose, technical solutions, and advantages of the present application are more apparent. It is to be understood that the specific embodiments described herein are merely intended to explain and are not to limit the present application. It is apparent to those skilled in the art that the present application may be implemented without some of these specific details. The description of the embodiments below is only to provide a better understanding of the present application by illustration of examples of the present application.

It is to be noted that in the present application, relationship terms such as first and second are used merely to distinguish one entity or operation from another entity or operation. It does not necessarily require or imply any such actual relationship or order between these entities or operations. Additionally, the term "comprising", "including", or any other variant thereof is intended to encompass a non-exclusive inclusion so that a process, method, article, or device that includes a series of elements not only includes the expressly listed elements but also includes other elements that are not expressly listed or elements inherent to such a process, method, article, or device. In the absence of more restrictions, the elements defined by the statement "including a . . . " do not exclude the presence of additional identical elements in the process, method, article, or device that includes the elements.

It is to be understood that the term "and/or" in the present application only describes the association relationships of associated objects and indicates that three relationships may exist. For example, A and/or B may indicate three conditions of A alone, both A and B, and B alone. In addition, the character "/" in the present application generally indicates that the front and rear associated objects are in an "or" relationship.

The term "connected" may refer to "electrically connected" or "electrically connected without passing an intervening transistor". The term "insulation" may refer to "electrically insulated" or "electrically isolated". The term "drive" may refer to "control" or "operate". The term "part" may refer to "partial". The term "pattern" may refer to "member". The term "end" may refer to "end segment" or "end edge". The display panel may be a display device or a module/part of a display device.

It is apparent to those skilled in the art that various modifications and changes in the present application may be made without departing from the spirit or scope of the present application. Accordingly, the present application is intended to cover modifications and variations of the present application that fall within the scope of the appended claims (the claimed technical solutions) and their equivalents. It is to be noted that the embodiments of the present application, if not in collision, may be combined with one another.

Before explaining technical solutions provided by the embodiments of the present application, the present application first specifically explains problems existing in the related technologies to facilitate the understanding of the embodiments of the present application.

Existing Organic Light Emitting Diode (OLED) display panels employ direct current (DC) dimming at high brightness and pulse-width modulation (PWM) dimming at low brightness.

After a lot of research by inventors, it is found that in the related art, a display panel uses the same black state voltage (VGMP) at both high brightness and low brightness. To ensure that the display panel can display black images at both the high brightness and the low brightness, the black state voltage is the maximum value of the corresponding the black state voltages in different brightness modes, which causes the data signal range of the display panel to be increased and thus results in high power consumption of the display panel.

In view of the preceding research by the inventors, embodiments of the present application provide a display panel, an integrated chip, and a display device, which helps reduce the power consumption of the display panel. The technical solutions in the embodiments of the present application are described clearly and completely hereinafter in conjunction with the drawings in the embodiments of the present application.

FIG. 1 is a diagram illustrating the structure of a pixel circuit in a display panel according to embodiments of the present application. As shown in FIG. 1, the display panel may include a pixel circuit 10 and a light-emitting element 20. The light-emitting element 20 may include an OLED.

The pixel circuit 10 may include a driving module 11 and a data writing module 12. The driving module 11 may be used for supplying a driving current to the light-emitting element 20. The data writing module 12 may be used for writing a data signal into the driving module 11. Illustratively, a first terminal of the data writing module 12 may be electrically connected to a data signal terminal 40, and a second terminal of the data writing module 12 may be electrically connected to a first terminal of the driving module 11. The data writing module 12 may be turned on or off under the control of a second scanning signal S2. When the second scanning signal S2 controls the data writing module 12 to be turned on, the data writing module 12 may write the data signal on the data signal terminal 40 into the driving module 11.

An operating mode of the display panel may include a first mode and a second mode. The brightness of the display panel in the first mode may be greater than the brightness of the display panel in the second mode.

The first mode may be a high-brightness mode. The second mode may be a low-brightness mode.

In some embodiments, the brightness of the display panel in the first mode may be greater than or equal to 100 nits, and the brightness of the display panel in the second mode may be less than or equal to 50 nits. In this manner, the current mode of the display panel can be quickly and accurately determined. That is, when the brightness of the display panel is greater than or equal to 100 nits, the display panel is in the high-brightness mode; when the brightness of the display panel is less than or equal to 50 nits, the display panel is at a low-brightness mode. Illustratively, in the first mode, the brightness of the display panel may be 500 nits, and in the second mode, the brightness of the display panel may be 2 nits.

It is to be noted that this embodiment of the present application is described by taking an example where the display panel includes a first mode and a second mode, and this example is not intended to limit the display panel in the present application to only include the first mode and the second mode. In other embodiments, the display panel may also include a third mode.

In the first mode, the data signal corresponding to the light-emitting element 20 is black state voltage $G0_1$, and in the second mode, the data signal corresponding to the light-emitting element 20 is black state voltage $G0_2$, where $G0_1 \neq G0_2$.

The black state voltage may be a voltage when the display panel displays black images. For example, a 0 gray-scale image is a black image, and the black state voltage may include a voltage corresponding to the 0 gray scale. For another example, 1 to 5 gray-scale images may be approximately black images, and the black state voltage may also include voltages corresponding to 1 to 5 gray scale.

In this embodiment of the present invention, different black state voltages are supplied to the pixel circuit 10 in different brightness modes so that the data signal range can be changed. In this manner, the display panel can display black images in different brightness modes, and the reduction of power consumption of the display panel is facilitated.

In an embodiment, the pixel circuit 10 may also include a first initialization module 13, a second initialization module 14, a threshold compensation module 15, a light-emitting control module 16, and a storage module 17. The light-emitting control module 16 may include a first light-emitting control module 161 and a second light-emitting control module 162. The first terminal of the driving module 11 may also be electrically connected to a first terminal of the first light-emitting control module 161. A second terminal of the driving module 11 may be electrically connected to a first terminal of the second light-emitting control module 162 and a first terminal of the threshold compensation module 15. A control terminal of the driving module 11 may be electrically connected to a second terminal of the threshold compensation module 15 and a first terminal of the second initialization module 14. A second terminal of the first light-emitting control module 161 may be electrically connected to a first power supply signal line PVDD. A second terminal of the second light-emitting control module 162 may be electrically connected to a first terminal of the first initialization module 13 and a first pole of the light-emitting element 20. A second terminal of the second initialization module 14 and a second terminal of the first initialization module 13 may both be electrically connected to an initialization signal terminal 30. A second pole of the light-emitting element 20 may be electrically connected to a second power supply signal line PVEE. The first power supply signal line PVDD may provide a positive voltage signal. The second power supply signal line PVEE may provide a negative voltage signal.

The threshold compensation module 15 may be used for capturing and compensating the threshold voltage of the driving module 11 under the control of the second scanning signal S2. The first initialization module 13 may be used for providing an initialization signal for the light-emitting element 20 under the control of a third scanning signal S3. The second initialization module 14 may be used for providing an initialization signal for a control terminal of the driving module 11 under the control of the first scanning signal S1. The light-emitting control module 16 may be used for controlling the light-emitting element 20 to enter a light-emitting phase under the control of a light-emitting control signal EM.

In an embodiment, the second scanning signal S2 may be reused as the third scanning signal S3.

Figure 3:
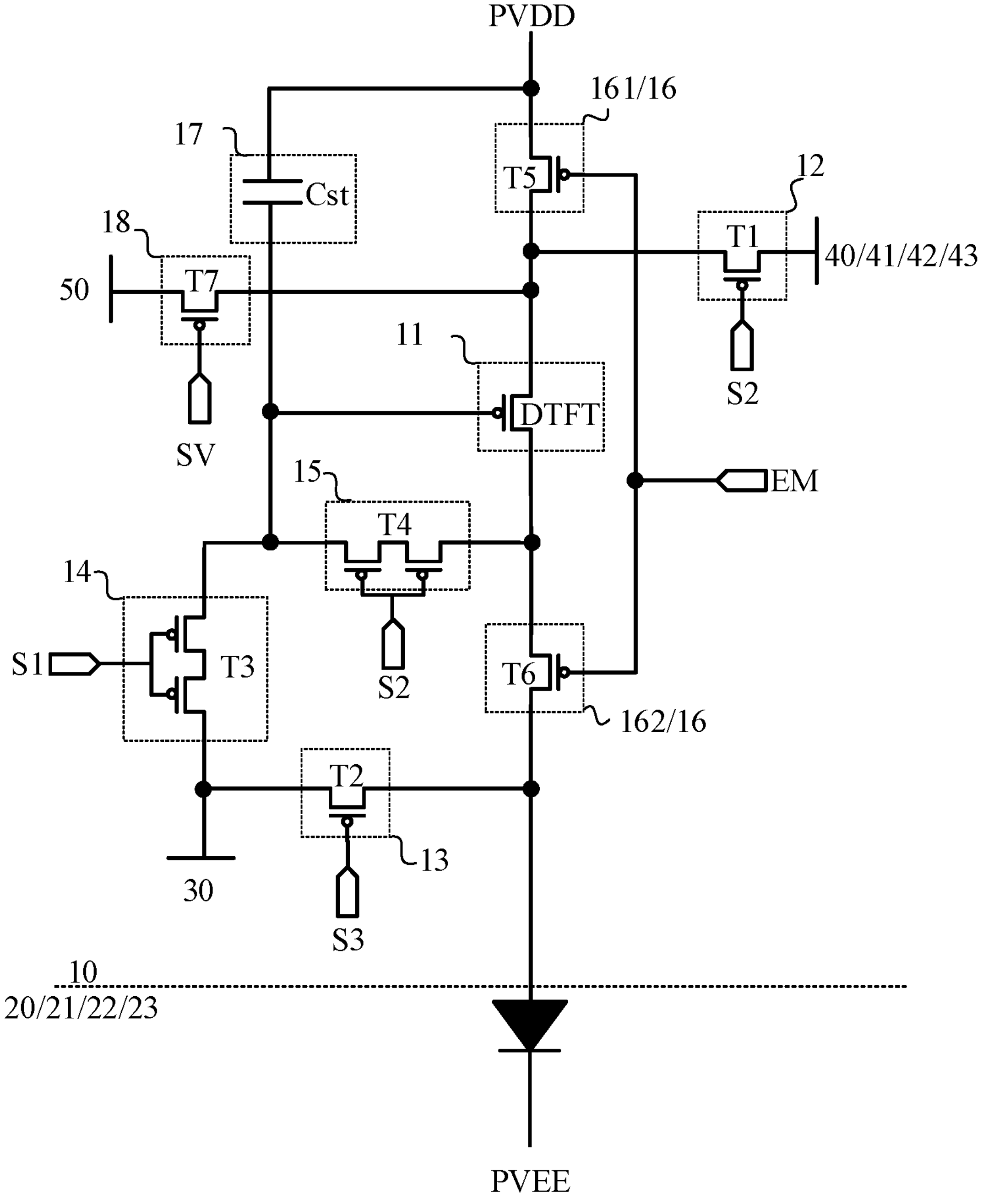
FIG. 3 is a diagram illustrating another structure of the pixel circuit in the display panel according to embodiments of the present application.
Figure 4:
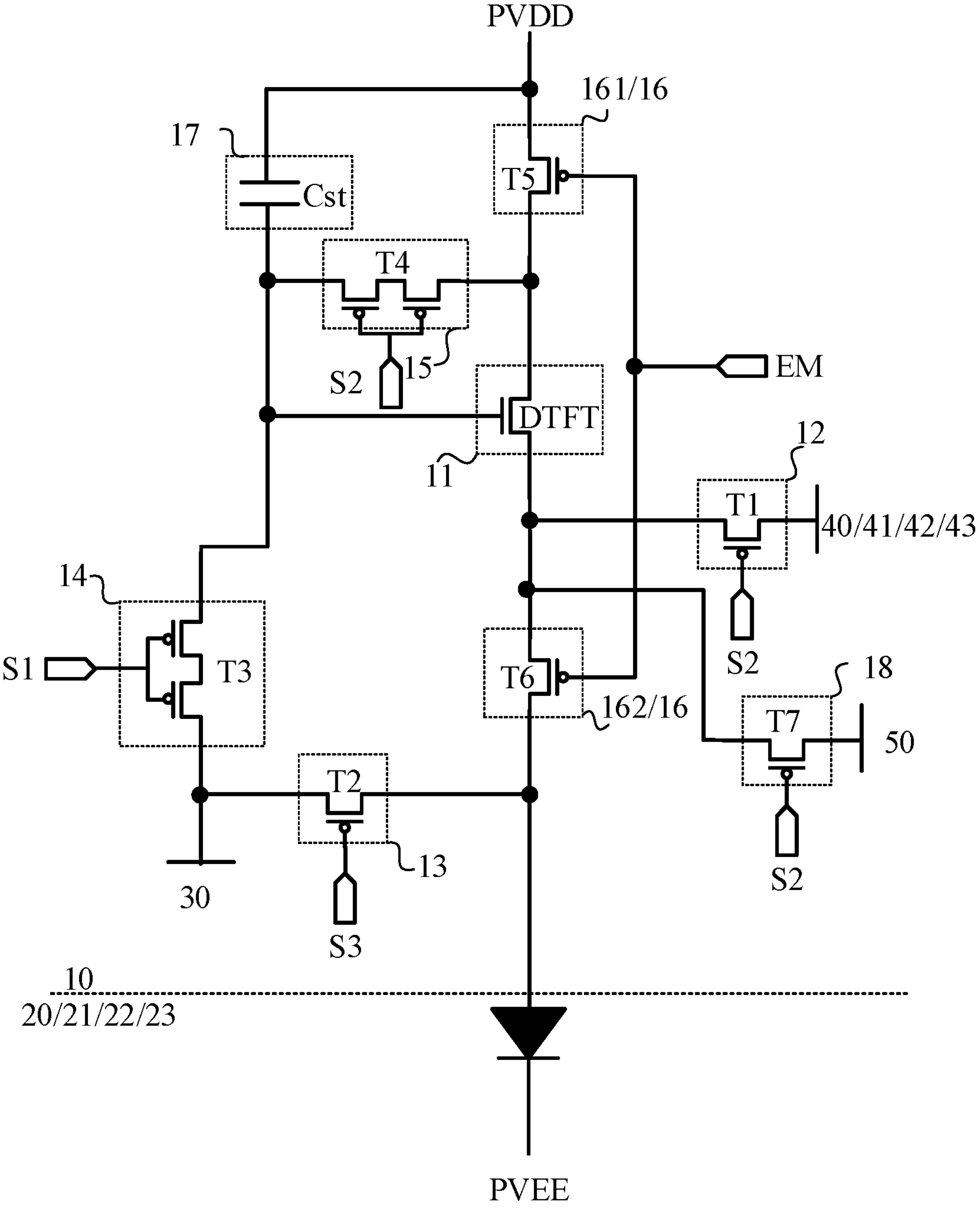
FIG. 4 is a diagram illustrating another structure of the pixel circuit in the display panel according to embodiments of the present application.

In an embodiment, as shown in FIGS. 3 and 4, the pixel circuit 10 may also include a bias module 18. A first terminal of the bias module 18 is electrically connected to a bias signal terminal 50. A second terminal of the bias module 18 may be electrically connected to the first terminal of the driving module 11 or the second terminal of the driving module 11. The bias module 18 may be used for providing a bias signal for the first terminal of the driving module 11 or the second terminal of the driving module 11.

It can be understood that the data signal corresponding to the light-emitting element in the first mode is not equal to the data signal corresponding to the light-emitting element in the second mode, which is also applicable to 8T1C circuits such as those in FIGS. 3 and 4. The following embodiments in the present application are also applicable to 8T1C circuits such as those in FIGS. 3 and 4.

Figure 2:
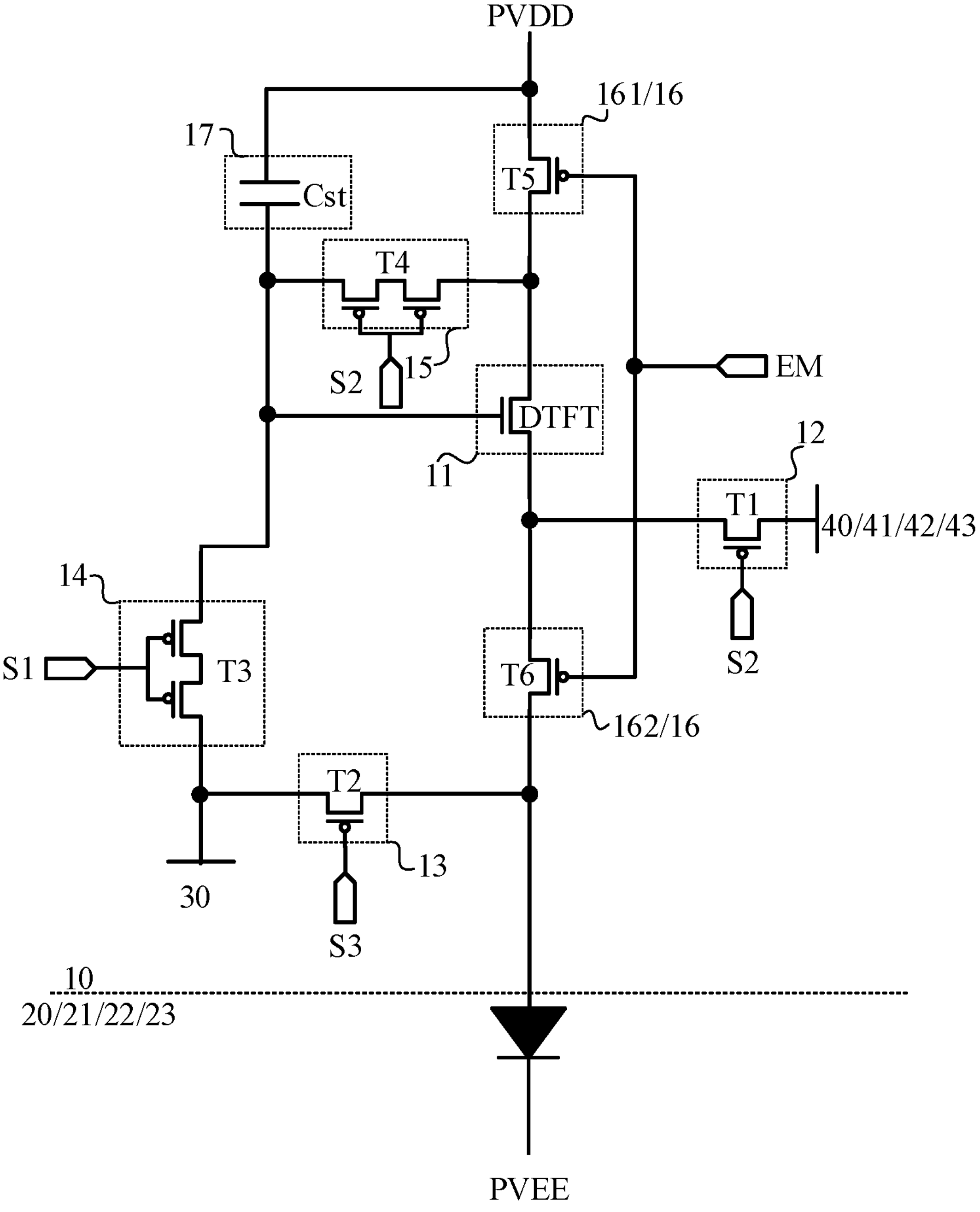
FIG. 2 is a diagram illustrating another structure of the pixel circuit in the display panel according to embodiments of the present application.

In embodiments of the present application, FIGS. 1 and 2 both use an example where the first initialization module 13 and the second initialization module 14 are electrically connected to the same initialization signal terminal, but the present application is not limited thereto. In other embodiments, the first initialization module 13 and the second initialization module 14 may be electrically connected to different initialization signal terminals.

Illustratively, the driving module 11 may include a driving thin-film transistor (DTFT), the data writing module 12 may include a first transistor T1, the first initialization module 13 may include a second transistor T2, the second initialization module 14 may include a third transistor T3, the threshold compensation module 15 may include a fourth transistor T4, the first light-emitting control module 161 may include a fifth transistor T5, the second light-emitting control module 162 may include a sixth transistor T6, and the bias module 18 may include a seventh transistor T7. The first terminal of the driving module 11 may be a first pole of the driving thin-film transistor (DTFT). The second terminal of the driving module 11 may be a second pole of the driving thin-film transistor (DTFT). A control terminal of the driving thin-film transistor (DTFT) may be a gate of the driving thin-film transistor (DTFT). The first terminal of the data writing module 12 may be a first pole of the first transistor T1. The second terminal of the data writing module 12 may be a second pole of the first transistor T1. A control terminal of the data writing module 12 may be a gate of the first transistor T1. A first pole of the light-emitting element 20 may be an anode. A second pole of the light-emitting element 20 may be a cathode. A first pole of each transistor may be one of a source or a drain, and a second pole may be the other of a source or a drain. The connection mode of each transistor is shown in FIG. 3 or FIG. 4, and details are not repeated herein.

In some embodiments, the first mode includes a first brightness segment, the second mode includes a second brightness segment, and any brightness in the first brightness segment may be greater than any brightness in the second brightness segment. The black state voltage of the data signal is $G0_{16}$ in the first brightness segment, and the black state voltage of the data signal is $G0_{23}$ in the second brightness segment, where $G0_{16} \neq G0_{23}$.

That is, when the display panel is in the first mode, the brightness of the display panel may be changed in the first brightness segment, and when the display panel is in the second mode, the brightness of the display panel may be changed in the second brightness segment. In the same brightness segment, the driving thin-film transistor (DTFT) may receive the same black state voltage, reducing the power consumption caused by frequent switching of the black state voltage and thus facilitating the reduction of the power consumption of the display panel. In different brightness segments, the driving thin-film transistor (DTFT) may receive different black state voltages, and the data signal range can be changed. In this manner, the display panel can display black images, and the reduction of power consumption of the display panel is facilitated.

In some alternative embodiments, the difference between the highest brightness value of the first brightness segment and the lowest brightness value of the first brightness segment is $\Delta L1$, and the difference between the highest brightness value of the second brightness segment and the lowest brightness value of the second brightness segment is $\Delta L2$, where $\Delta L1 > \Delta L2$.

The brightness of the display panel may be determined by the light-emitting brightness level of the light-emitting element 20 that may be represented by a gray scale. Illustratively, the display panel may include 256 gray scales from gray scale 0 to gray scale 255, and the brightness of the light-emitting element 20 may be gradually increased in the order of gray scale 0 to gray scale 255. With respect to the first mode, in the second mode, human eyes are relatively sensitive to changes in the light-emitting brightness, that is, small changes in the light-emitting brightness can be perceived by the human eyes. Therefore, the difference $\Delta L1$ between the highest brightness value of the first brightness segment and the lowest brightness value of the first brightness segment is configured to be greater than the difference $\Delta L2$ between the highest brightness value of the second brightness segment and the lowest brightness value of the second brightness segment. In this manner, in the case where the same black state voltage is adopted when the brightness of the display panel changes in the same brightness segment, and/or in the case where different black state voltages are adopted when the brightness of the display panel changes in different brightness segments, it is advantageous to increase the display uniformity of the display panel when the brightness of the display panel changes in each brightness segment.

Illustratively, the first brightness segment may be 100 nits to 1000 nits, and the second brightness segment may be 0 nit to 50 nits, where $\Delta L1$ is 900 nits, and $\Delta L2$ is 50 nits.

In the related art, when the driving thin-film transistor (DTFT) is a P-type transistor, the black state voltage corresponding to the light-emitting element in the first mode is equal to the black state voltage corresponding to the light-emitting element in the second mode. However, after a lot of research by the inventors, it is found that the black state voltage actually required for displaying black images by the display panel in the first mode is smaller than the black state voltage actually required for displaying black images by the display panel in the second mode. Illustratively, when the brightness of the display panel is 500 nits and 2 nits, a black state voltage of 6.85 V is adopted to enable the display panel to display black images. However, when the brightness is 500 nits, the data signal of the display panel is 6.4 V or even lower than 6.4 V, the display panel can also display black images. The P-type transistor may be a PMOS-type transistor or another P-type transistor, which is not limited herein.

Figure 5:
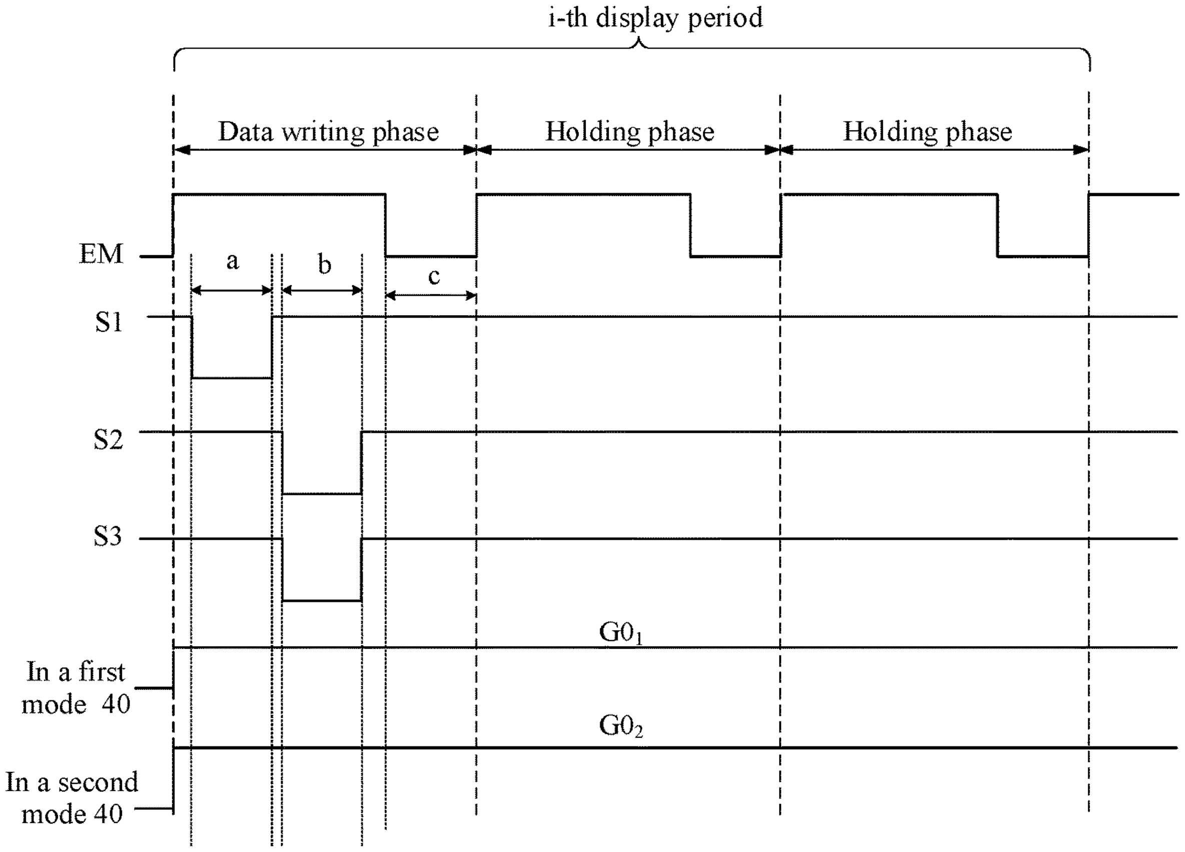
FIG. 5 is a timing diagram corresponding to FIG. 1.

That is, when the driving thin-film transistor is a P-type transistor, the same light-emitting element adopts the same black state voltage in different brightness modes, resulting in a higher black state voltage at high brightness and an increased data signal range. The display panel has a problem of high power consumption. Based on this and as shown in FIGS. 1 and 5, in the case where the driving thin-film transistor (DTFT) is a P-type transistor in this embodiment of the present application, black state voltage $G0_1$ corresponding to the light-emitting element 20 in the first mode and black state voltage $G0_2$ corresponding to the light-emitting element 20 in the second mode may satisfy the following: $G0_1<G0_2$. Thus, the data signal range can be reduced by the reduction of the corresponding black state voltage in the first mode. In this manner, the display panel can display black images in different modes, and the reduction of power consumption of the display panel is facilitated.

Figure 6:
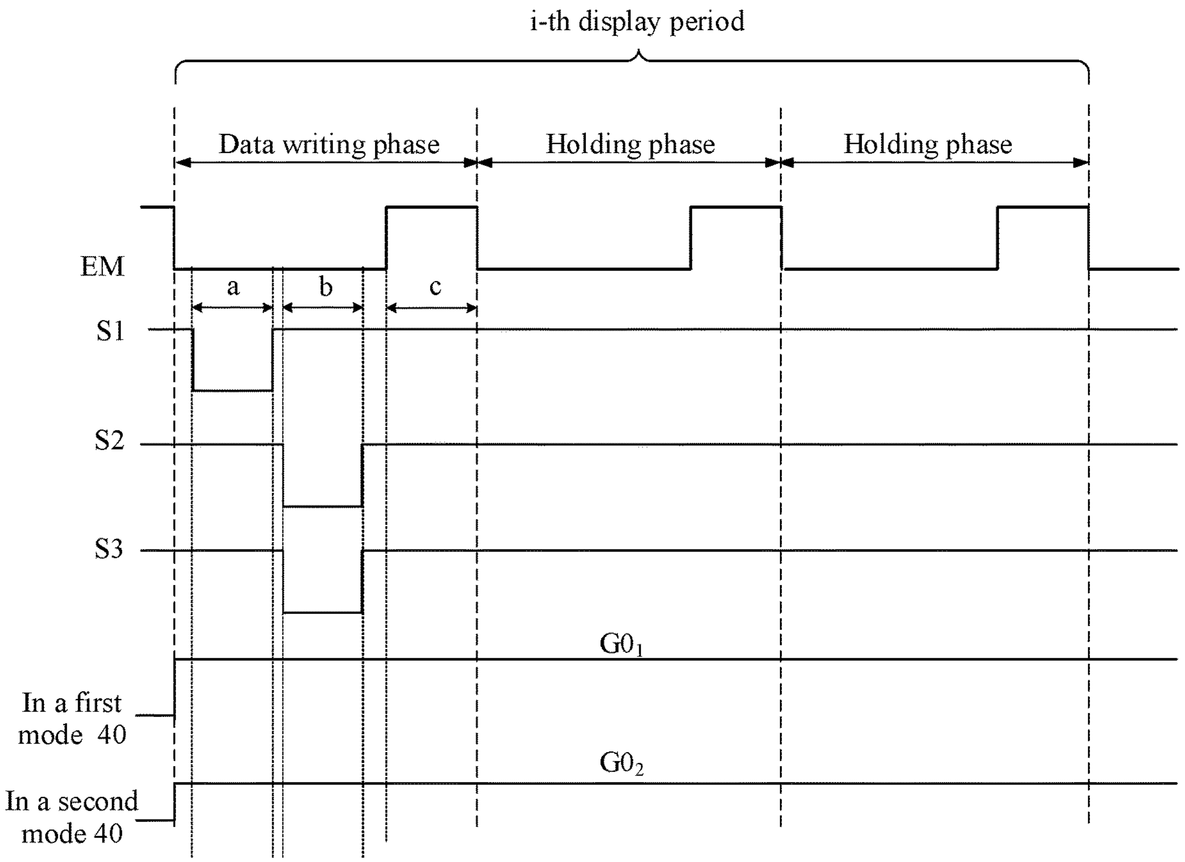
FIG. 6 is a timing diagram corresponding to FIG. 2.

Accordingly, as shown in FIGS. 2 and 6, in the case where the driving thin-film transistor (DTFT) is an N-type transistor, black state voltage $G0_1$ corresponding to the light-emitting element 20 in the first mode and black state voltage $G0_2$ corresponding to the light-emitting element 20 in the second mode satisfy the following: $G0_1>G0_2$. Thus, the data signal range in the second mode can be reduced by the reduction of the corresponding black state voltage in the second mode. In this manner, the display panel can display black images in different modes, and the reduction of power consumption of the display panel is facilitated. The N-type transistor may be an NMOS-type transistor or another N-type transistor, which is not limited herein.

The display panel may include multiple light-emitting elements having different light-emitting colors, for example, a light-emitting element that emits red light, a light-emitting element that emits green light, and a light-emitting element that emits blue light. After a lot of research by the inventors, it is found that different light-emitting elements in the related art adopt the same black state voltage. To ensure that different light-emitting elements of the display panel can be in a black state, the black state voltage is the maximum value among black state voltages corresponding to the light-emitting elements of different colors, which causes the data signal range of the display panel to be increased and thus results in high power consumption of the display panel.

In some embodiments, the light-emitting element 20 includes a first light-emitting element 21 and a second light-emitting element 22, the first light-emitting element 21 and the second light-emitting element 22 have different light-emitting colors, and in the first mode or the second mode, the data signal corresponding to the first light-emitting element 21 is black state voltage $G0_{11}$, and the data signal corresponding to the second light-emitting element 22 is black state voltage $G0_{12}$, where $G0_{11}\neq G0_{12}$. In other words, in the first mode or the second mode, the data signal provided by a data signal terminal 41 corresponding to the first light-emitting element 21 is black state voltage $G0_{11}$, and the data signal provided by a data signal terminal 42 corresponding to the second light-emitting element 22 is black state voltage $G0_{12}$, where $G0_{11}\neq G0_{12}$.

That is, in the same brightness mode, black state voltages corresponding to light-emitting elements of different light-emitting colors are different. Thus, black state voltages of the light-emitting elements of different light-emitting colors can be changed so that the data signal range of the light-emitting elements of different light-emitting colors can be changed. In this manner, the light-emitting elements of different light-emitting colors can be in a black state in the same brightness mode, that is, the display panel can display black images, and the reduction of power consumption of the display panel is facilitated.

The first light-emitting element 21 may emit blue light or red light. The second light-emitting element 22 may emit green light.

After a lot of research by the inventors, it is found that different light-emitting elements have different voltages in a black state due to different characteristics of the material systems of these different light-emitting elements.

Figure 7:
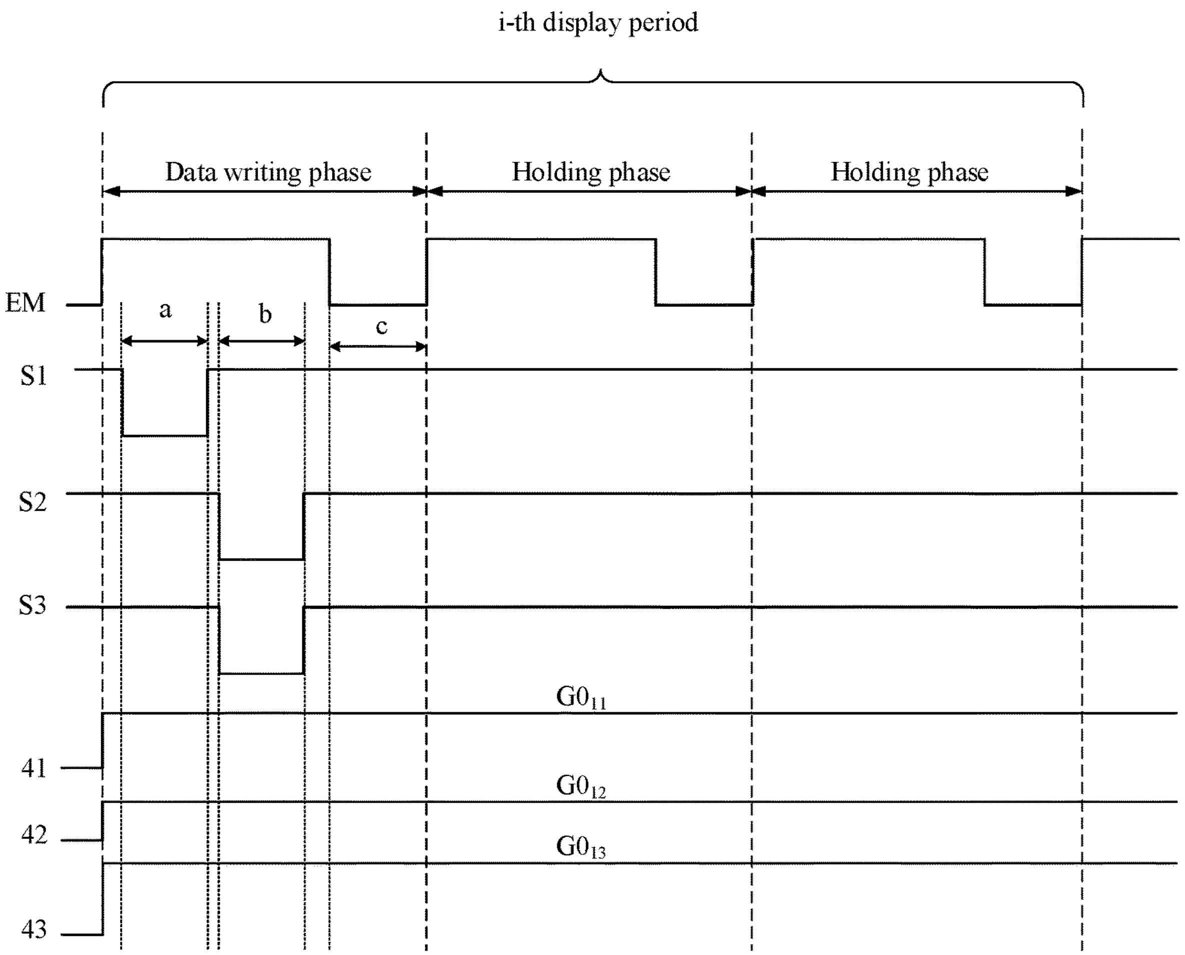
FIG. 7 is another timing diagram corresponding to FIG. 1.

An example is shown in FIGS. 1 and 7. The material system of the first light-emitting element 21, such as the turn-on voltage and light-emitting efficiency, is different from the material system of the second light-emitting element 22, such as the turn-on voltage and light-emitting efficiency. As a result, in the case where the driving thin-film transistor (DTFT) is a P-type transistor, black state voltage $G0_{11}$ corresponding to the first light-emitting element 21 and black state voltage $G0_{12}$ corresponding to the second light-emitting element 22 may satisfy the following: $G0_{12}<G0_{11}$. In the case where the driving thin-film transistor (DTFT) is a P-type transistor, the data signal range corresponding to the second light-emitting element 22 can be reduced by the reduction of black state voltage $G0_{12}$ corresponding to the second light-emitting element 22, and the light-emitting elements of different light-emitting colors can all be in a black state in the same brightness mode, that is, the display panel can display black images in the same brightness mode, and the reduction of power consumption of the display panel is facilitated.

Figure 8:
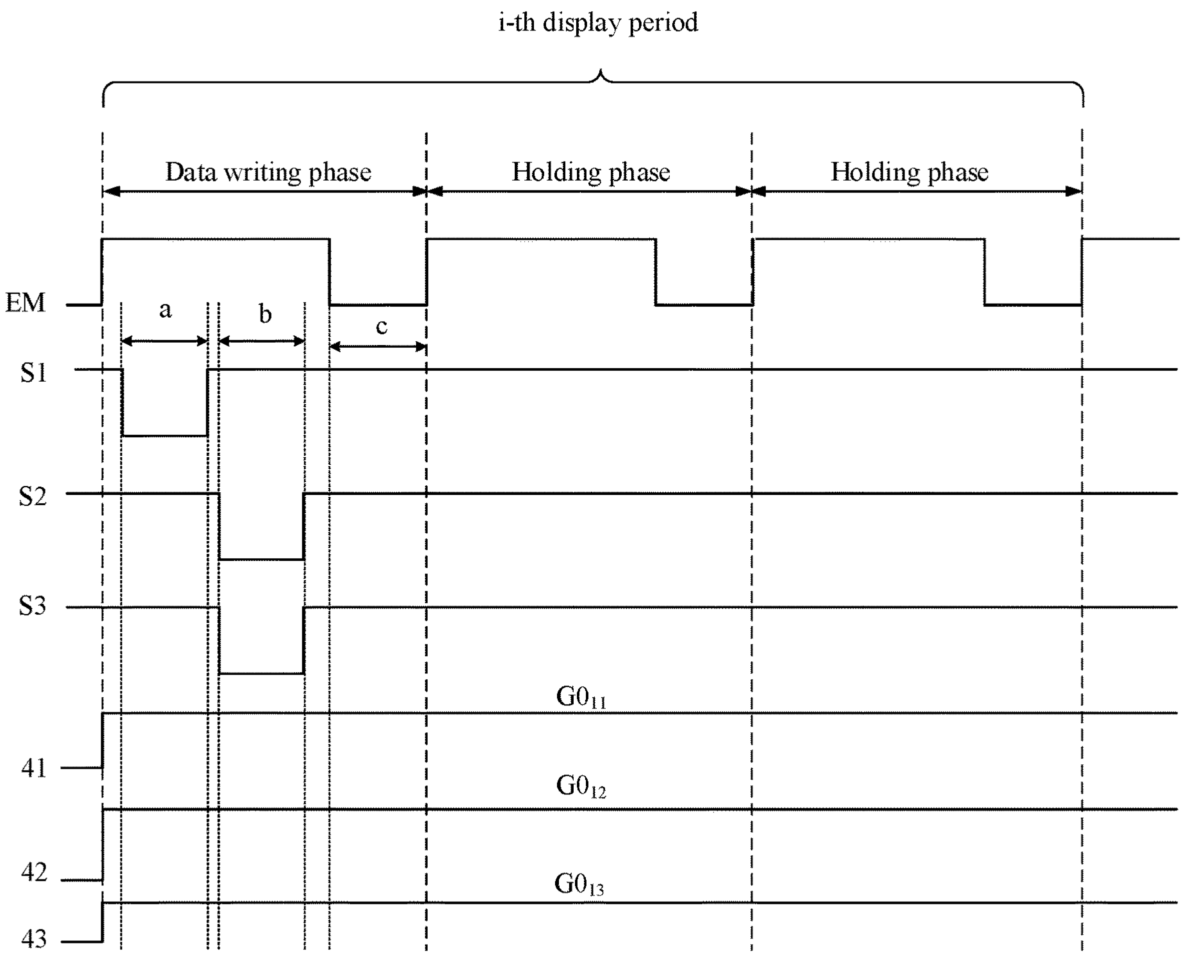
FIG. 8 is another timing diagram corresponding to FIG. 2.

Another example is shown in FIGS. 2 and 8. The material system of the first light-emitting element 21, such as the turn-on voltage and light-emitting efficiency, is different from the material system of the second light-emitting element 22, such as the turn-on voltage and light-emitting efficiency. As a result, in the case where the driving thin-film transistor (DTFT) is an N-type transistor, black state voltage $G0_{11}$ corresponding to the first light-emitting element 21 and black state voltage $G0_{12}$ corresponding to the second light-emitting element 22 may satisfy the following: $G0_{11}<G0_{12}$. Thus, the data signal range corresponding to the first light-emitting element 21 can be reduced by the reduction of black state voltage $G0_{11}$ corresponding to the first light-emitting element 21, and the light-emitting elements of different light-emitting colors can all be in a black state in the same brightness mode, that is, the display panel can display black images in the same brightness mode, and the reduction of power consumption of the display panel is facilitated.

In some embodiments, the light-emitting element 20 also includes a third light-emitting element 23, and the first light-emitting element 21, the second light-emitting element 22, and the third light-emitting element 23 have different light-emitting colors. Illustratively, the first light-emitting element 21 may emit blue light, the second light-emitting element 22 may emit green light, and the third light-emitting element 23 may emit red light.

In the first mode or the second mode, the data signal corresponding to the third light-emitting element 23 is black state voltage $G0_{13}$, and black state voltage $G0_{11}$ corresponding to the first light-emitting element 21, black state voltage $G0_{12}$ corresponding to the second light-emitting element 22, and black state voltage $G0_{13}$ corresponding to the third light-emitting element 23 may satisfy the following: $G0_{11} \neq G0_{12} \neq G0_{13}$. In other words, in the first mode or the second mode, the data signal provided by the data signal terminal 41 corresponding to the first light-emitting element 21 is black state voltage $G0_{11}$, the data signal provided by the data signal terminal 42 corresponding to the second light-emitting element 22 is black state voltage $G0_{12}$, and the data signal provided by a data signal terminal 43 corresponding to the third light-emitting element 23 is black state voltage $G0_{13}$, where $G0_{11} \neq G0_{12} \neq G0_{13}$.

That is, in the same brightness mode, a different black state voltage is supplied to the first light-emitting element 21, the second light-emitting element 22, and the third light-emitting element 23 separately so that the data signal ranges of at least two light-emitting elements can be changed. In this manner, the first light-emitting element 21, the second light-emitting element 22, and the third light-emitting element 23 are all in a black state, that is, the display panel can display black images, and the reduction of power consumption of the display panel is facilitated.

An example is shown in FIGS. 1 and 7. The material system of the first light-emitting element 21, such as the turn-on voltage and light-emitting efficiency, the material system of the second light-emitting element 22, such as the turn-on voltage and light-emitting efficiency, and the material system of the third light-emitting element 23, such as the turn-on voltage and light-emitting efficiency are different. As a result, in the case where the first light-emitting element 21 emits blue light, the second light-emitting element 22 emits green light, the third light-emitting element 23 emits red light, and the driving thin-film transistor (DTFT) is a P-type transistor, black state voltage $G0_{11}$ corresponding to the first light-emitting element 21, black state voltage $G0_{12}$ corresponding to the second light-emitting element 22, and black state voltage $G0_{13}$ corresponding to the third light-emitting element 23 may satisfy the following: $G0_{12} < G0_{11} < G0_{13}$.

Thus, the data signal range corresponding to the first light-emitting element 21 and the data signal range corresponding to the second light-emitting element 22 can be reduced by the reduction of black state voltage $G0_{11}$ corresponding to the first light-emitting element 21 and black state voltage $G0_{12}$ corresponding to the second light-emitting element 22. Additionally, the light-emitting elements of different light-emitting colors can all be in a black state in the same brightness mode, that is, the display panel can display black images in the same brightness mode, and the reduction of power consumption of the display panel is facilitated.

Another example is shown in FIGS. 2 and 8. The material system of the first light-emitting element 21, such as the turn-on voltage and light-emitting efficiency, the material system of the second light-emitting element 22, such as the turn-on voltage and light-emitting efficiency, and the material system of the third light-emitting element 23, such as the turn-on voltage and light-emitting efficiency are different. As a result, in the case where the first light-emitting element 21 emits blue light, the second light-emitting element 22 emits green light, the third light-emitting element 23 emits red light, and the driving thin-film transistor (DTFT) is an N-type transistor, black state voltage $G0_{11}$ corresponding to the first light-emitting element 21, black state voltage $G0_{12}$ corresponding to the second light-emitting element 22, and black state voltage $G0_{13}$ corresponding to the third light-emitting element 23 may satisfy the following: $G0_{13} < G0_{11} < G0_{12}$.

Thus, the data signal range corresponding to the first light-emitting element 21 and the data signal range corresponding to the third light-emitting element 23 can be reduced by the reduction of black state voltage $G0_{11}$ corresponding to the first light-emitting element 21 and black state voltage $G0_{13}$ corresponding to the third light-emitting element 23. Additionally, the light-emitting elements of different light-emitting colors can all be in a black state in the same brightness mode, that is, the display panel can display black images in the same brightness mode, and the reduction of power consumption of the display panel is facilitated.

In an embodiment, black state voltage $G0_{11}$ corresponding to the first light-emitting element 21, black state voltage $G0_{12}$ corresponding to the second light-emitting element 22, and black state voltage $G0_{13}$ corresponding to the third light-emitting element 23 may satisfy the following: $|G0_{13} - G0_{11}| \leq |G0_{11} - G0_{12}|$. In this manner, the adjusted difference between black state voltage of the first light-emitting element 21 and the black state voltage of the third light-emitting element 23 can be prevented from being too large so that it is more advantageous to reduce the power consumption of the display panel.

Further, $0V \leq |G0_{13} - G0_{11}| \leq 0.1V$, and $0V \leq |G0_{11} - G0_{12}| \leq 0.2V$.

As an example, in the case where the driving thin-film transistor (DTFT) is a P-type transistor, the difference between black state voltage $G0_{13}$ corresponding to the third light-emitting element 23 and black state voltage $G0_{11}$ corresponding to the first light-emitting element 21 may be smaller than or equal to the difference between black state voltage $G0_{11}$ corresponding to the first light-emitting element 21 and black state voltage $G0_{12}$ corresponding to the second light-emitting element 22, that is, $G0_{13} - G0_{11} \leq G0_{11} - G0_{12}$. More specifically, the difference between black state voltage $G0_{13}$ corresponding to the third light-emitting element 23 and black state voltage $G0_{11}$ corresponding to the first light-emitting element 21 may be greater than or equal to 0V and less than or equal to 0.1V, that is, $0V \leq |G0_{13} - G0_{11}| \leq 0.1V$; the difference between black state voltage $G0_{11}$ corresponding to the first light-emitting element 21 and black state voltage $G0_{12}$ corresponding to the second light-emitting element 22 may be greater than or equal to 0V and less than or equal to 0.2V, that is, $0V \leq G0_{11} - G0_{12} \leq 0.1V$.

As another example, in the case where the driving thin-film transistor (DTFT) is an N-type transistor, the difference between black state voltage $G0_{11}$ corresponding to the first light-emitting element 21 and black state voltage $G0_{13}$ corresponding to the third light-emitting element 23 may be smaller than or equal to the difference between black state voltage $G0_{12}$ corresponding to the second light-emitting element 22 and black state voltage $G0_{11}$ corresponding to the first light-emitting element 21, that is, $G0_{11} - G0_{13} \leq G0_{12} - G0_{11}$. More specifically, the difference between black state voltage $G0_{11}$ corresponding to the first light-emitting element 21 and black state voltage $G0_{13}$ corresponding to the third light-emitting element 23 may be greater than or equal to 0V and less than or equal to 0.1V, that is, $0V \leq G0_{11} - G0_{13} \leq 0.1V$; the difference between black state voltage $G0_{12}$ corresponding to the second light-emitting element 22 and black state voltage $G0_{11}$ corresponding to the first light-emitting element 21 may be greater than or equal to 0V and less than or equal to 0.2V, that is, $0V \leq G0_{12} - G0_{11} \leq 0.2V$.

Figure 9:
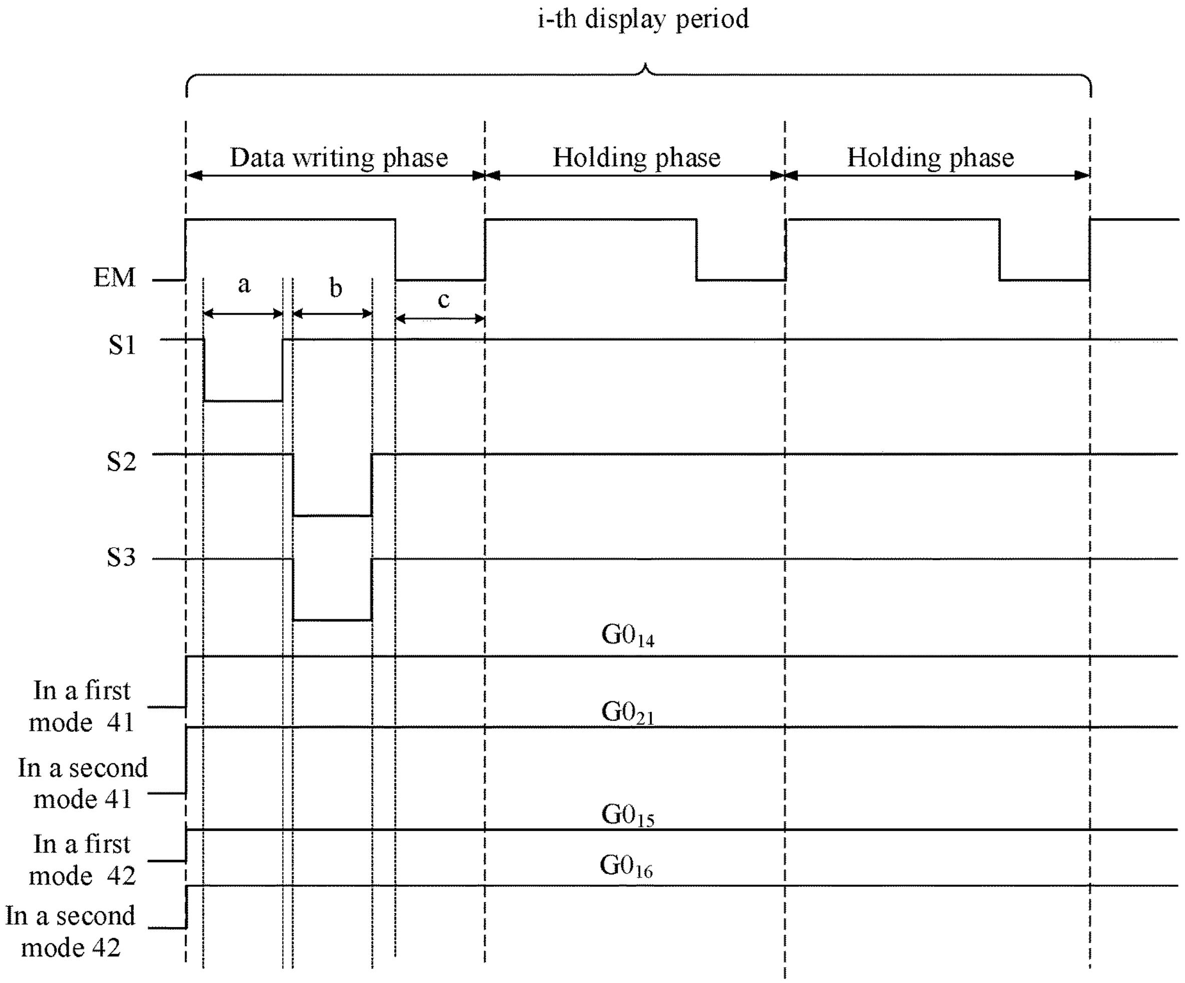
FIG. 9 is a timing diagram corresponding to FIG. 1 or FIG. 2.

In some embodiments, as shown in FIGS. 1 and 9, the light-emitting element 20 may include a first light-emitting element 21 and a second light-emitting element 22, the first light-emitting element 21 may emit blue light or red light, and the second light-emitting element 22 may emit green light.

In the first mode, the data signal corresponding to the first light-emitting element 21 may be black state voltage $G0_{14}$, and the data signal corresponding to the second light-emitting element 22 may be black state voltage $G0_{15}$.

In the second mode, the data signal corresponding to the first light-emitting element 21 may be black state voltage $G0_{21}$, and the data signal corresponding to the second light-emitting element 22 may be black state voltage $G0_{22}$.

The black state voltage $G0_{14}$ corresponding to the first light-emitting element 21 in the first mode and black state voltage $G0_{21}$ corresponding to the first light-emitting element 21 in the second mode may satisfy the following: $G0_{14} < G0_{21}$.

In an embodiment, black state voltage $G0_{15}$ corresponding to the second light-emitting element 22 in the first mode and black state voltage $G0_{22}$ corresponding to the second light-emitting element 22 in the second mode may satisfy the following: $G0_{15} < G0_{22}$.

That is, for a light-emitting element of the same light-emitting color, the black state voltage in the high-brightness mode is smaller than the black state voltage in the low-brightness mode. In other words, the reduction of the black state voltage in the high-brightness mode can reduce the data signal range in the high-brightness mode so that the display panel can display black images in different brightness modes, and the reduction of power consumption of the display panel is facilitated. Additionally, since a light-emitting element emitting blue light and a light-emitting element emitting red light have similar characteristics, the light-emitting element emitting blue light and the light-emitting element emitting red light may share the same black state voltage in the same brightness mode.

In an embodiment, black state voltage $G0_{14}$ corresponding to the first light-emitting element 21 in the first mode, black state voltage $G0_{15}$ corresponding to the second light-emitting element 22 in the first mode, black state voltage $G0_{21}$ corresponding to the first light-emitting element 21 in the second mode, and black state voltage $G0_{22}$ corresponding to the second light-emitting element 22 in the second mode may satisfy the following: $G0_{21} - G0_{14} = G0_{22} - G0_{15}$. That is, the black state voltage difference between light-emitting elements of different colors in different brightness modes is a fixed value. When the display panel is switched from the first mode to the second mode or from the second mode to the first mode, black state voltage jump variables corresponding to light-emitting elements of different light-emitting colors are the same.

Illustratively, the difference between black state voltage $G0_{21}$ corresponding to the first light-emitting element 21 in the second mode and black state voltage $G0_{14}$ corresponding to the first light-emitting element 21 in the first mode may be greater than or equal to 0.3V and less than or equal to 0.5V, that is, $0.3V \leq G0_{21} - G0_{14} \leq 0.5V$.

Accordingly, the difference between black state voltage $G0_{22}$ corresponding to the second light-emitting element 22 in the second mode and black state voltage $G0_{15}$ corresponding to the second light-emitting element 22 in the first mode may be greater than or equal to 0.3V and less than or equal to 0.5V, that is, $0.3V \leq G0_{22} - G0_{15} \leq 0.5V$.

In an embodiment, the light-emitting element 20 may include a first light-emitting element 21, a second light-emitting element 22, and a third light-emitting element 23. The first light-emitting element 21 may emit blue light, the second light-emitting element 22 may emit green light, and the third light-emitting element 23 may emit red light.

In the first mode, the data signal corresponding to the first light-emitting element 21 may be black state voltage $G0_{14}$, the data signal corresponding to the second light-emitting element 22 may be black state voltage $G0_{15}$, and the data signal corresponding to the third light-emitting element 23 may be black state voltage $G0_{16}$.

In the second mode, the data signal corresponding to the first light-emitting element 21 may be black state voltage $G0_{21}$, the data signal corresponding to the second light-emitting element 22 may be black state voltage $G0_{22}$, and the data signal corresponding to the third light-emitting element 23 may be black state voltage $G0_{23}$.

Black state voltage $G0_{14}$ corresponding to the first light-emitting element 21 in the first mode, black state voltage $G0_{15}$ corresponding to the second light-emitting element 22 in the first mode, black state voltage $G0_{16}$ corresponding to the third light-emitting element 23 in the first mode, black state voltage $G0_{21}$ corresponding to the first light-emitting element 21 in the second mode, and black state voltage $G0_{22}$ corresponding to the second light-emitting element 22 in the second mode, and black state voltage $G0_{23}$ corresponding to the third light-emitting element 23 in the second mode may satisfy the following: $G0_{21} - G0_{14} = G0_{22} - G0_{15} = G0_{23} - G0_{16}$. That is, the black state voltage difference between light-emitting elements of different colors in different brightness modes is a fixed value. When the display panel is switched from the first mode to the second mode or from the second mode to the first mode, black state voltage jump variables corresponding to light-emitting elements of different light-emitting colors are the same.

Illustratively, the difference between black state voltage $G0_{23}$ corresponding to the third light-emitting element 23 in the second mode and black state voltage $G0_{16}$ corresponding to the third light-emitting element 23 in the first mode may be greater than or equal to 0.3V and less than or equal to 0.5V, that is, $0.3V \leq G0_{23} - G0_{16} \leq 0.5V$.

Referring to FIGS. 1 to 4, the pixel circuit 10 may also include a first initialization module 13 used for providing an initialization signal for the light-emitting element 20. When turned on, the first initialization module 13 provides an initialization signal to the light-emitting element 20. Illustratively, the third scanning signal on the third scanning signal line S3 may control the second transistor T2 to be turned on or off. Specifically, when the third scanning signal S3 is at the on level, the second transistor T2 is controlled to be turned on, and the initialization signal at the initialization signal terminal 30 is transmitted to the anode of the light-emitting element 20 through the second transistor T2 to initialize the anode of the light-emitting element 20. When the third scanning signal S3 is at an off level, the second transistor T2 is controlled to be turned off. When the transistor is an N-type transistor, the on level is high level, and the off level is low level; when the transistor is a P-type transistor, the on level is low level, and the off level is high level.

Figure 10:
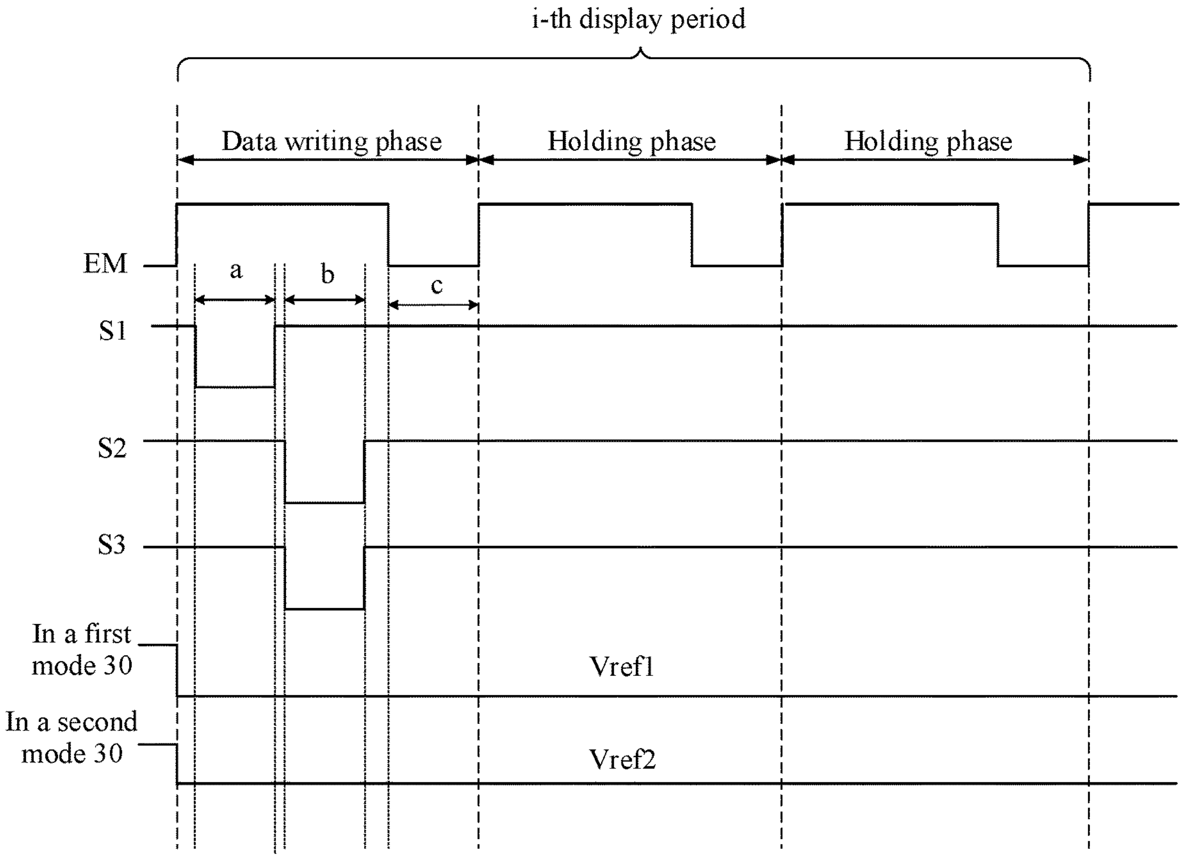
FIG. 10 is another timing diagram corresponding to FIG. 1 or FIG. 2.

As shown in FIGS. 1 and 10, the voltage of the initialization signal in the first mode is Vref1, the voltage of the initialization signal in the second mode is Vref2, and the initialization signal voltage Vref1 in the first mode and the initialization signal voltage Vref2 in the second mode may satisfy the following: |Vref1|>|Vref2|. Illustratively, the initialization signal provided by the initialization signal terminal 30 is Vref1 in the first mode, and the initialization signal provided by the initialization signal terminal 30 is Vref2 in the second mode, where Vref1<Vref2.

After a lot of research by the inventors, it is found that in the high-brightness mode of the display panel, the anode of the light-emitting element 20 accumulates more charges, and the cathode of the light-emitting element 20 often receives a fixed negative power supply signal so that the difference between the anode and the cathode of the light-emitting element 20 is relatively large. In the low-brightness mode of the display panel, however, the difference between the anode and the cathode of the light-emitting element 20 is relatively small. Based on this, the absolute value of the initialization signal voltage Vref1 in the high-brightness mode may be configured to be greater than the absolute value of the initialization signal voltage Vref2 in the low-brightness mode to balance the initialization effect of the light-emitting element 20 in different brightness modes.

During the operation of the pixel circuit, Vref1 and Vref2, and Vref3, Vref4, Vref5, Vref6, Vref7, and Vref8 hereinafter may all be negative voltage values. At this time, the initialization voltage Vref1 in the first mode and the initialization signal voltage Vref2 in the second mode may satisfy the following: Vref1<Vref2.

Illustratively, when the brightness of the display panel is 500 nits, that is, in the first mode, Vref1 may be −2.3 V; when the brightness of the display panel is 2 nits, that is, in the second mode, Vref2 may be −3 V. The preceding values are only used as examples and are not intended to limit the present application. The values of Vref1 and Vref2 may be set according to practical conditions.

Figure 11:
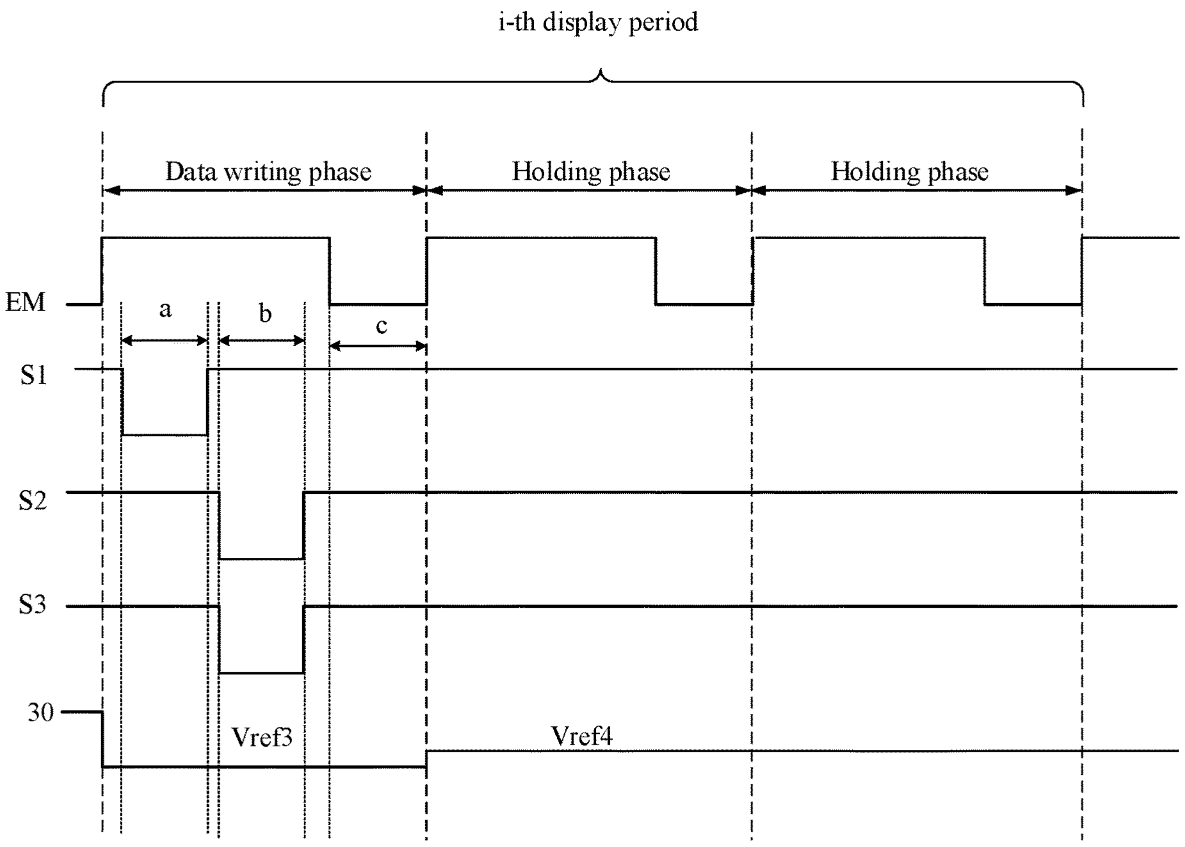
FIG. 11 is another timing diagram corresponding to FIG. 1 or FIG. 2.

As shown in FIGS. 1 and 11, the display period of the display panel includes at least a data writing phase and a holding phase, and the pixel circuit also includes a first initialization module 13 configured to supply an initialization signal to the light-emitting element 20. In the data writing phase, the driving module 11 in the pixel circuit 10 writes a data signal. In the holding phase, the driving module 11 in the pixel circuit 10 does not write a data signal. FIGS. 5 to 12 illustrate an example where the display period of the display panel includes one data writing phase and two holding phases, but the present application is not limited thereto. The number of data writing phases and holding phases in the display period of the display panel may be configured according to practical conditions.

Still as shown in FIGS. 1 and 11, the data writing phase may include an initialization sub-phase a, a data writing sub-phase b, and a light-emitting phase c. In the initialization sub-phase a, the first scanning signal S1 is low level, a second initialization module 14 is turned on, and the initialization signal supplied by the initialization signal terminal 30 is written into the control terminal of the driving module 11. In the data writing sub-phase b, the second scanning signal S2 and the third scanning signal S3 are both low level, the data writing module 12 and the threshold compensation module 15 are both turned on, the data signal supplied by the data signal terminal 40 is written into the control terminal of the driving module 11, the first initialization module 13 is turned on, and the initialization signal supplied by the initialization signal terminal 30 is written into the anode of the light-emitting element 20. In the light-emitting phase c, the light-emitting control signal EM is low level, the first light-emitting control module 161 and the second light-emitting control module 162 are both turned on, and the driving current generated by the driving module 11 is transmitted to the light-emitting element 20, which emits light.

The data writing phase corresponding to the pixel circuit shown in FIG. 3 or FIG. 4 differs from the data writing phase corresponding to the pixel circuit shown in FIG. 1 or FIG. 2 in that the data writing phase corresponding to the pixel circuit shown in FIG. 3 or FIG. 4 also includes a bias sub-phase d (not shown). The bias sub-phase d may be located between the initialization sub-phase a and the data writing sub-phase b, or may be located before the data writing sub-phase b, and at least partially overlaps with the initialization sub-phase a. Referring to FIG. 3 or FIG. 4, in the bias sub-phase d, a scanning signal SV is low level, the bias module 18 is turned on, and the bias signal supplied by the bias signal terminal 50 is written into the first terminal of the driving module 11 or into a second terminal of the bias signal.

The voltage of the initialization signal is Vref3 in the data writing phase, and the voltage of the initialization signal is Vref4 in the holding phase, where Vref3 and Vref4 may satisfy the following: |Vref3|>|Vref4|. Illustratively, in the same brightness mode, the initialization signal provided by the initialization signal terminal 30 is Vref3 in the data writing phase, and the initialization signal provided by the initialization signal terminal 30 is Vref4 in the holding phase, where Vref3≤Vref4.

In some possible cases, in the display period of the display panel in the same brightness mode, the data signal is not supplied to the driving module 11 in the holding phase so that the driving current supplied by the driving module 11 to the light-emitting element 20 in the holding phase is consistent with the driving current supplied by the driving module 11 to the light-emitting element 20 in the data writing phase. In this manner, the anode voltage of the light-emitting element 20 in the holding phase is the same as the anode voltage of the light-emitting element 20 in the data writing phase. At this time, the voltage Vref3 of the initialization signal in the data writing phase may be equal to the voltage Vref4 of the initialization signal in the holding phase.

In other possible cases, in the display period of the display panel in the same brightness mode, the anode voltage of the light-emitting element 20 may change over time so that the anode voltage of the light-emitting element 20 in the data writing phase differs from the anode voltage of the light-emitting element 20 in the holding phase. At this time, the voltage Vref3 of the initialization signal in the data writing phase is smaller than the voltage Vref4 of the initialization signal in the holding phase, which is beneficial to balance the initialization effects in the data writing phase and the holding phase.

As an example, in the high-brightness mode, the voltage Vref3 of the initialization signal in the data writing phase may be smaller than the voltage Vref4 of the initialization signal in the holding phase. For example, when the brightness of the display panel is 300 nits, Vref3 may be −2.8 V, and Vref4 may be −2.7 V. For another example, when the brightness of the display panel is 800 nits, Vref3 may be −3 V, and Vref4 may be −2.9 V. For another example, when the brightness of the display panel is 100 nits, Vref3 may be −2.6 V, and Vref4 may be −2.5 V.

As another example, in the low-brightness mode, the voltage Vref3 of the initialization signal in the data writing phase may be equal to the voltage Vref4 of the initialization signal in the holding phase. For example, when the brightness of the display panel is 2 nits, both Vref3 and Vref4 may be −2 V. For another example, when the brightness of the display panel is 10 nits, both Vref3 and Vref4 may be −2.2 V. For another example, when the brightness of the display panel is 50 nits, Vref3 may be −2.4 V, and Vref4 may be −2.3 V.

The preceding values are only used as examples and are not intended to limit the present application. The values of Vref3 and Vref4 may be set according to practical conditions.

Figure 12:
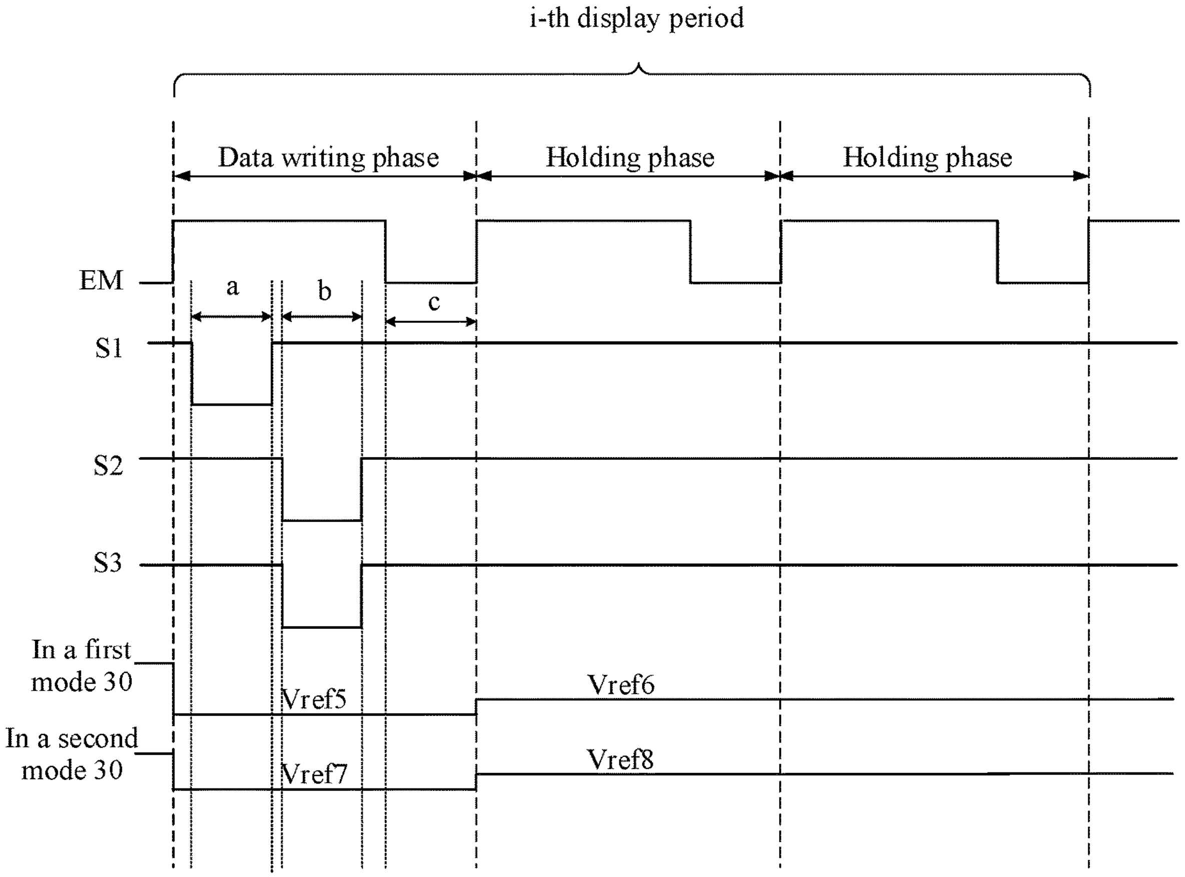
FIG. 12 is another timing diagram corresponding to FIG. 1 or FIG. 2.

In some embodiments, as shown in FIGS. 1 and 12, the voltage of the initialization signal is Vref5 in the data writing phase in the first mode, and the voltage of the initialization signal is Vref6 in the data writing phase in the second mode, where |Vref5|>|Vref6|. The initialization signal provided by the initialization signal terminal 30 is Vref5 in the data writing phase in the first mode, and the initialization signal provided by the initialization signal terminal 30 is Vref6 in the data writing phase in the second mode, where Vref5<Vref6.

The duration of the data writing phase in the high-brightness mode is shorter than the duration of the data writing phase in the low-brightness mode so that the anode voltage of the light-emitting element 20 in the data writing phase in the high-brightness mode is different from the anode voltage of the light-emitting element 20 in the data writing phase in the low-brightness mode. At this time, the voltage of the initialization signal in the data writing phase in the high-brightness mode is smaller than the voltage of the initialization signal in the data writing phase in the low-brightness mode, which facilitates the balance of the initialization effect of the light-emitting element 20 in the data writing phase in different brightness modes.

In an embodiment, the voltage of the initialization signal is Vref7 in the holding phase in the first mode, and the voltage of the initialization signal is Vref8 in the holding phase in the second mode, where |Vref7|>|Vref8|. Illustratively, the initialization signal provided by the initialization signal terminal 30 is Vref7 in the holding phase in the first mode, and the initialization signal provided by the initialization signal terminal 30 is Vref8 in the holding phase in the second mode, where Vref7<Vref8.

The duration of the holding phase in the high-brightness mode is longer than the duration of the holding phase in the low-brightness mode so that the anode voltage of the light-emitting element 20 in the holding phase in the high-brightness mode is different from the anode voltage of the light-emitting element 20 in the holding phase in the low-brightness mode. At this time, the voltage Vref7 of the initialization signal in the holding phase in the high-brightness mode is smaller than the voltage Vref8 of the initialization signal in the holding phase in the low-brightness mode, which facilitates the balance of the initialization effect of the light-emitting element 20 in the holding phase in different brightness modes.

It can be understood that the voltage Vref1 of the initialization signal in the first mode may include the voltage Vref5 of the initialization signal in the data writing phase in the first mode and the voltage Vref7 of the initialization signal in the holding phase in the first mode. Similarly, the voltage Vref2 of the initialization signal in the second mode may include the voltage Vref6 of the initialization signal in the data writing phase in the second mode and the voltage Vref8 of the initialization signal in the holding phase in the second mode.

The voltage Vref3 of the initialization signal in the data writing phase may include the voltage Vref5 of the initialization signal in the data writing phase in the first mode and the voltage Vref6 of the initialization signal in the data writing phase in the second mode. Similarly, the voltage Vref4 of the initialization signal in the holding phase may include the voltage Vref7 of the initialization signal in the holding phase in the first mode and the voltage Vref8 of the initialization signal in the holding phase in the second mode.

Based on the same inventive concept, embodiments of the present application also provide an integrated chip, which can be used for supplying a signal to the display panel described in the preceding embodiments. An operating mode of the display panel may include a first mode and a second mode. The brightness of the display panel in the first mode may be greater than the brightness of the display panel in the second mode.

In the first mode, the data signal supplied by the integrated chip is black state voltage $G0_1$, and in the second mode, the data signal supplied by the integrated chip is black state voltage $G0_2$, where $G0_1 \neq G0_2$.

In embodiments of the present application, the data signal and/or the initialization signal received by the display panel may be supplied by the integrated chip, and characteristics of the data signal and/or the initialization signal in any of the preceding embodiments may be supplied by the integrated chip.

It can be understood that the integrated chip provided in the embodiments of the present application has the beneficial effect of the display panel provided in the embodiments of the present application. For details, reference may be made to the detailed description of the display panel in the embodiments described above, and details of the embodiments are not repeated herein.

Figure 13:
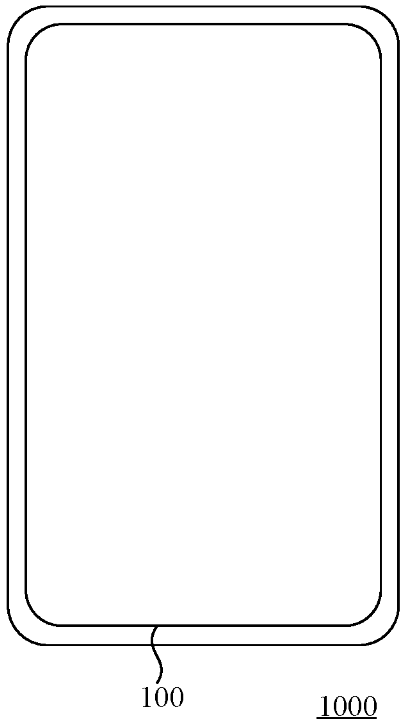
FIG. 13 is a diagram illustrating the structure of a display device according to embodiments of the present application.

This embodiment also provides a display device, including the display panel provided in the present application. Reference is made to FIG. 13. FIG. 13 is a diagram illustrating the structure of a display device according to embodiments of the present application. The display device 1000 provided by FIG. 13 includes the display panel 100 according to any embodiment of the present application. The embodiment in FIG. 13 only uses a mobile phone as an example to explain the display device 1000. It can be understood that the display device provided in the embodiments of the present application may be a wearable product, a computer, a television, a vehicle-mounted display device, and other devices with display functions, which is not limited by the present application. The display device provided in the embodiments of the present application has the beneficial effect of the display panel provided in the embodiments of the present application. For details, reference can be made to the specific description of the display panel in the preceding embodiments, and details are not repeated herein.

In accordance with the preceding embodiments of the present application, these embodiments are not intended to be exhaustive or to limit the application to the specific embodiments described. Obviously, many modifications and variations are possible in light of the preceding description. These embodiments have been chosen and described in detail herein to better explain the principles and practical application of the present application and to enable those skilled in the art to make good use of the present application and modifications based on the present application. This application is limited only by the claims, the full scope thereof, and equivalents.

What is claimed is:

1. A display panel comprising a pixel circuit and a light-emitting element, wherein the pixel circuit comprises a driving circuit and a data writing circuit;

the driving circuit is configured to supply a driving current to the light-emitting element;

the data writing circuit is configured to write a data signal into the driving circuit; and an operating mode of the display panel comprises a first mode and a second mode, wherein brightness of the display panel in the first mode is greater than brightness of the display panel in the second mode;

in the first mode, when the display panel displays a black state image, the data signal written into the driving circuit corresponding to the light-emitting element is black state voltage $G0_1$;

and in the second mode, when the display panel displays the black state image, the data signal written into the driving circuit corresponding to the light-emitting element is black state voltage $G0_2$, wherein $G0_1 \neq G0_2$, wherein the driving circuit comprises a driving transistor; and in a case where the driving transistor is a P-type transistor, $G0_1 < G0_2$; or in a case where the driving transistor is an N-type transistor, $G0_1 > G0_2$.

2. The display panel of claim 1, wherein the light-emitting element comprises a first light-emitting element and a second light-emitting element, and the first light-emitting element and the second light-emitting element have different light-emitting colors, and wherein in the first mode or the second mode, the data signal written into the driving circuit corresponding to the first light-emitting element is black state voltage $G0_{11}$, and the data signal written into the driving circuit corresponding to the second light-emitting element is black state voltage $G0_{12}$, wherein $G0_{11} \neq G0_{12}$.

3. The display panel of claim 2, wherein the driving circuit comprises a driving transistor, the first light-emitting element emits blue light or red light, and the second light-emitting element emits green light; and in a case where the driving transistor is a P-type transistor, $G0_{12} < G0_{11}$; or in a case where the driving transistor is an N-type transistor, $G0_{11} < G0_{12}$.

4. The display panel of claim 2, wherein the light-emitting element further comprises a third light-emitting element, and the first light-emitting element, the second light-emitting element, and the third light-emitting element have different light-emitting colors; and in the first mode or the second mode, the data signal written into the driving circuit corresponding to the third light-emitting element is black state voltage $G0_{13}$, where $G0_{11} \neq G0_{12} \neq G0_{13}$.

5. The display panel of claim 4, wherein the driving circuit comprises a driving transistor; the first light-emitting element emits blue light, the second light-emitting element emits green light, and the third light-emitting element emits red light; and in a case where the driving transistor is a P-type transistor, $G0_{12} < G0_{11} < G0_{13}$; or in a case where the driving transistor is an N-type transistor, $G0_{13} < G0_{11} < G0_{12}$.

6. The display panel of claim 5, wherein $|G0_{13} - G0_{11}| \leq |G0_{11} - G0_{12}|$.

7. The display panel of claim 6, wherein $0V \leq |G0_{13} - G0_{11}| \leq 0.1V$, and $0V \leq |G0_{11} - G0_{12}| \leq 0.2V$.

8. The display panel of claim 1, wherein the brightness of the display panel in the first mode is greater than or equal to 100 nits, and the brightness of the display panel in the second mode is less than or equal to 50 nits.

9. The display panel of claim 1, wherein the pixel circuit further comprises a first initialization circuit configured to supply an initialization signal to the light-emitting element, a voltage of the initialization signal in the first mode is Vref1, and a voltage of the initialization signal in the second mode is Vref2, wherein $|Vref1| > |Vref2|$.

10. The display panel of claim 1, wherein the first mode comprises a first brightness segment, the second mode comprises a second brightness segment, and any brightness in the first brightness segment is greater than any brightness in the second brightness segment; and black state voltage of the data signal is $G0_{16}$ in the first brightness segment, and black state voltage of the data signal is $G0_{23}$ in the second brightness segment, wherein $G0_{16} \neq G0_{23}$.

11. The display panel of claim 10, wherein a difference between a highest brightness value of the first brightness segment and a lowest brightness value of the first brightness segment is $\Delta L1$, and a difference between a highest brightness value of the second brightness segment and a lowest brightness value of the second brightness segment is $\Delta L2$, wherein $\Delta L1 > \Delta L2$.

12. An integrated chip configured to supply a signal to the display panel of claim 1.

13. A display device, comprising the display panel of claim 1.

14. A display panel comprising a pixel circuit and a light-emitting element, wherein the pixel circuit comprises a driving circuit and a data writing circuit;

the driving circuit is configured to supply a driving current to the light-emitting element;

the data writing circuit is configured to write a data signal into the driving circuit; and an operating mode of the display panel comprises a first mode and a second mode, wherein brightness of the display panel in the first mode is greater than brightness of the display panel in the second mode;

in the first mode, when the display panel displays a black state image, the data signal written into the driving circuit corresponding to the light-emitting element is black state voltage $G0_1$;

and in the second mode, when the display panel displays the black state image, the data signal written into the driving circuit corresponding to the light-emitting element is black state voltage $G0_2$, wherein $G0_1 \neq G0_2$, wherein the light-emitting element comprises a first light-emitting element and a second light-emitting element, the first light-emitting element emits blue light or red light, and the second light-emitting element emits green light;

in the first mode, the data signal written into the driving circuit corresponding to the first light-emitting element is black state voltage $G0_{14}$, and the data signal written into the driving circuit corresponding to the second light-emitting element is black state voltage $G0_{15}$;

in the second mode, the data signal written into the driving circuit corresponding to the first light-emitting element is black state voltage $G0_{21}$, and the data signal written into the driving circuit corresponding to the second light-emitting element is black state voltage $G0_{22}$;

wherein $G0_{14}$, $G0_{21}$, $G0_{15}$ and $G0_{22}$ satisfy at least one of: $G0_{14}<G0_{21}$, or $G0_{15}<G0_{22}$.

15. The display panel of claim 14, wherein $G0_{21}-G0_{14}=G0_{22}-G0_{15}$.

16. The display panel of claim 15, wherein $0.3V\leq G0_{21}-G0_{14}\leq 0.5V$.

17. A display device, comprising the display panel of claim 14.

18. A display panel comprising a pixel circuit and a light-emitting element, wherein the pixel circuit comprises a driving circuit and a data writing circuit;

the driving circuit is configured to supply a driving current to the light-emitting element;

the data writing circuit is configured to write a data signal into the driving circuit; and an operating mode of the display panel comprises a first mode and a second mode, wherein brightness of the display panel in the first mode is greater than brightness of the display panel in the second mode;

in the first mode, when the display panel displays a black state image, the data signal written into the driving circuit corresponding to the light-emitting element is black state voltage G01;

and in the second mode, when the display panel displays the black state image, the data signal written into the driving circuit corresponding to the light-emitting element is black state voltage G02, wherein G01≠G02, wherein a display period of the display panel comprises at least a data writing phase and a holding phase, and the pixel circuit further comprises a first initialization circuit configured to supply an initialization signal to the light-emitting element; and a voltage of the initialization signal is Vref3 in the data writing phase, and a voltage of the initialization signal is Vref4 in the holding phase, wherein |Vref3|≥|Vref4|.

19. The display panel of claim 18, wherein the data writing phase and the holding phase satisfy at least one of:

in a data writing phase in the first mode, a voltage of the initialization signal is Vref5, and in a data writing phase in the second mode, a voltage of the initialization signal is Vref6, where |Vref5|>|Vref6|; or in a holding phase in the first mode, a voltage of the initialization signal is Vref7, and in a holding phase in the second mode, a voltage of the initialization signal is Vref8, wherein |Vref7|>|Vref8|.

20. A display device, comprising the display panel of claim 18.

* * * * *